(12) United States Patent
Kim et al.

(10) Patent No.: US 8,861,130 B1
(45) Date of Patent: Oct. 14, 2014

(54) SPINDLE MOTOR AND RECORDING DISK DRIVING DEVICE INCLUDING THE SAME

(71) Applicant: Samsung Electro-Mechanics Co., Ltd., Suwon (KR)

(72) Inventors: Sung Hoon Kim, Suwon (KR); Hyun Gi Yang, Suwon (KR); Young Sun Yoo, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/943,361

(22) Filed: Jul. 16, 2013

(30) Foreign Application Priority Data

Mar. 25, 2013 (KR) .......................... 10-2013-0031480

(51) Int. Cl.
*G11B 17/08* (2006.01)
(52) U.S. Cl.
USPC ...................................... 360/99.08
(58) Field of Classification Search
USPC ...................................... 360/99.08
See application file for complete search history.

(56) References Cited

U.S. PATENT DOCUMENTS

| | | | |
|---|---|---|---|
| 5,490,021 A * | 2/1996 | Muller et al. | 360/98.07 |
| 8,300,355 B2 * | 10/2012 | Yang | 360/99.08 |
| 2009/0080819 A1 | 3/2009 | Rehm | |
| 2011/0317950 A1 | 12/2011 | Lee | |
| 2013/0321946 A1 | 12/2013 | Kimura et al. | |

FOREIGN PATENT DOCUMENTS

| | | |
|---|---|---|
| JP | 2004-316680 | 11/2004 |
| JP | 2008-64302 | 3/2008 |
| JP | 2014-5933 | 1/2014 |
| KR | 10-2012-0001485 | 1/2012 |
| KR | 10-2012-0076263 | 7/2012 |
| KR | 10-2013-0016806 | 2/2013 |

OTHER PUBLICATIONS

Japanese Office Action mailed Feb. 18, 2014 in corresponding Japanese Application No. 2013-145484.
Korean Office Action issued Apr. 23, 2014 in corresponding Korean Patent Application No. 10-2013-0031480.

* cited by examiner

*Primary Examiner* — Mark Blouin

(57) ABSTRACT

There is provided a spindle motor including: a sleeve fixedly installed on the base member and having a circulation hole formed therein; a shaft rotatably inserted into a shaft hole of the sleeve; a rotor hub fixedly installed on an upper end portion of the shaft; and a thrust member installed in an installation groove of the sleeve and forming a connection part while being installed in the installation groove, the connection part being connected to the circulation hole, wherein the connection part is formed by the sleeve and the rotor hub and connects a sealing part in which a liquid-vapor interface is disposed and the circulation hole to each other, and an upper and lower radial dynamic grooves allowing a lubricating fluid to move from a lower end portion of the shaft toward the upper end portion thereof during rotation of the shaft.

12 Claims, 10 Drawing Sheets

SPINDLE MOTOR AND RECORDING DISK DRIVING DEVICE INCLUDING THE SAME

CROSS-REFERENCE TO RELATED APPLICATIONS

This application claims the priority of Korean Patent Application No. 10-2013-0031480 filed on Mar. 25, 2013, in the Korean Intellectual Property Office, the disclosure of which is incorporated herein by reference.

BACKGROUND OF THE INVENTION

1. Field of the Invention

The present invention relates to a spindle motor and a recoding disk driving device including the same.

2. Description of the Related Art

Generally, a small spindle motor used in a hard disk drive (HDD) serves to rotate a disk so that a magnetic head may write data to the disk or read data from the disk.

In addition, the spindle motor is provided with a hydrodynamic bearing assembly, and a bearing clearance formed in the hydrodynamic bearing assembly is filled with a lubricating fluid.

In addition, during rotation of a shaft, the lubricating fluid filled in the bearing clearance is pumped to form fluid dynamic pressure therein, thereby rotatably supporting the shaft.

However, pressure lower than atmospheric pressure, that is, negative pressure, may be generated in the bearing clearance due to the pumping of the lubricating fluid during rotation of the shaft.

In this case, air contained in the lubricating fluid expands, such that air bubbles may be formed. When such air bubbles are introduced into a groove pumping the lubricating fluid, deterioration of rotational characteristics such as the generation of insufficient fluid dynamic pressure, the generation of vibrations, and the like, is caused.

Therefore, a circulation hole for decreasing the generation of negative pressure is formed in a sleeve to suppress the generation of negative pressure.

In the following Related Art Document (US 2009-80819), a configuration in which a circulation hole for decreasing the generation of negative pressure is formed to be inclined and connects a bearing clearance formed by a sleeve and a cover member and a bearing clearance in which a liquid-vapor interface is formed to each other has been used.

However, it may be relatively difficult to process the circulation hole and a defect of the sleeve may occur during processing of the circulation hole.

Further, recently, durability, that is, durability allowing for a longer lifespan of the spindle motor, has been demanded in spindle motors. In addition, in order to increase the lifespan of spindle motors, the bearing clearance should be sufficiently filled with lubricating fluid, and the spindle motor should be operated normally, even in the case that a predetermined amount of lubricating fluid has evaporated.

That is, the development of a structure allowing the spindle motor normally operated, even in the case that a predetermined amount of lubricating fluid is evaporated, has been demanded.

RELATED ART DOCUMENT (Patent Document 1) US Patent Laid-Open Publication No. 2009-80819

SUMMARY OF THE INVENTION

An aspect of the present invention provides a spindle motor having an increased lifespan, and a recording disk driving device including the same.

According to an aspect of the present invention, there is provided a spindle motor including: a sleeve fixedly installed on the base member and having a circulation hole formed therein; a shaft rotatably inserted into a shaft hole of the sleeve; a rotor hub fixedly installed on an upper end portion of the shaft; and a thrust member installed in an installation groove of the sleeve and forming a connection part while being installed in the installation groove, the connection part being connected to the circulation hole, wherein the connection part is formed by the sleeve and the rotor hub and connects a sealing part in which a liquid-vapor interface is disposed and the circulation hole to each other, and the sleeve includes upper and lower radial dynamic grooves formed in an inner peripheral surface thereof, the upper and lower radial dynamic grooves allowing a lubricating fluid to move from a lower end portion of the shaft toward the upper end portion thereof during rotation of the shaft.

The lower radial dynamic groove may have an axial length greater than that of the upper radial dynamic groove.

A thickness of an inner diameter portion of the thrust member may be different from that of an outer diameter portion thereof.

A transversal cross section of the thrust member may have a trapezoidal shape.

The thrust member may have an inclined surface, and a facing surface of the installation groove disposed to face the inclined surface and the inclined surface may be disposed to be spaced apart from each other by a predetermined gap to form the connection part in the case in which the thrust member is installed in the installation groove.

The thrust member may have an inclined surface, a facing surface of the installation groove disposed to face the inclined surface may have a gradient different from that of the inclined surface, and a clearance formed by the inclined surface and the facing surface of the installation groove may be widened in an outer diameter direction or be widened in an inner diameter direction to form the connection part.

The thrust member may have first and second inclined surfaces, a facing surface of the installation groove disposed to face the first and second inclined surfaces may have a gradient different from those of the first and second inclined surfaces, and a clearance formed by the first inclined surface and the facing surface of the installation groove may be widened in an outer diameter direction and a clearance formed by the second inclined surface and the facing surface of the installation groove may be narrowed toward the outer diameter direction to form the connection part.

The thrust member may have an inner peripheral surface and a lower surface bonded to the sleeve.

A thrust dynamic groove may be formed in at least one of an upper surface of the thrust member and a lower surface of the rotor hub in order to generate thrust fluid dynamic pressure.

The sleeve and the thrust member may be formed of different materials or have outer surfaces coated with different materials.

The spindle motor may further include a cover member fixedly installed on a lower surface of the sleeve to prevent leakage of the lubricating fluid.

According to another aspect of the present invention, there is provided a recording disk driving device including: the spindle motor as described above rotating a recording disk; a head transfer part transferring a head detecting information of the recording disk mounted on the spindle motor to the recording disk; and a housing accommodating the spindle motor and the head transfer part therein.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
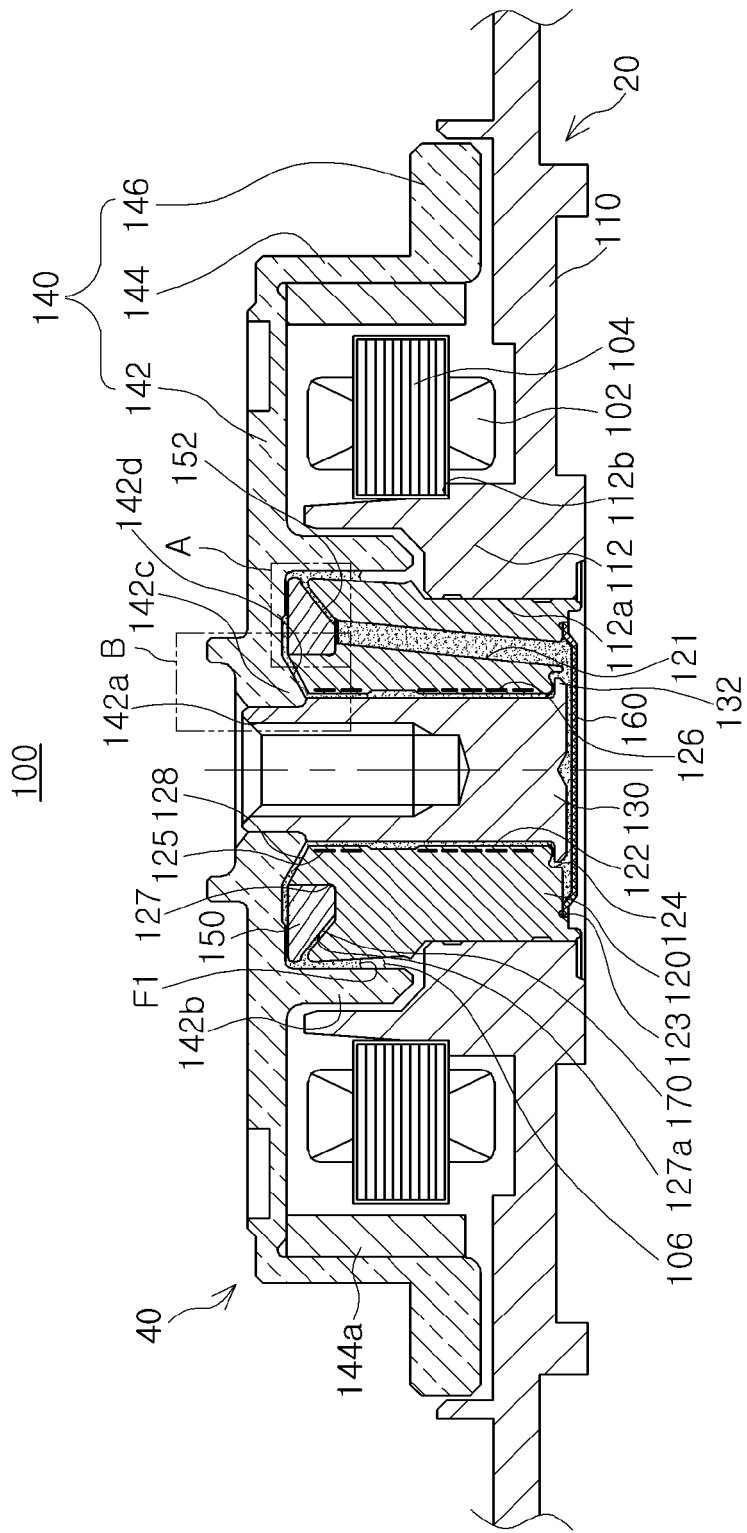
FIG. 1 is a schematic cross-sectional view showing a spindle motor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 2:
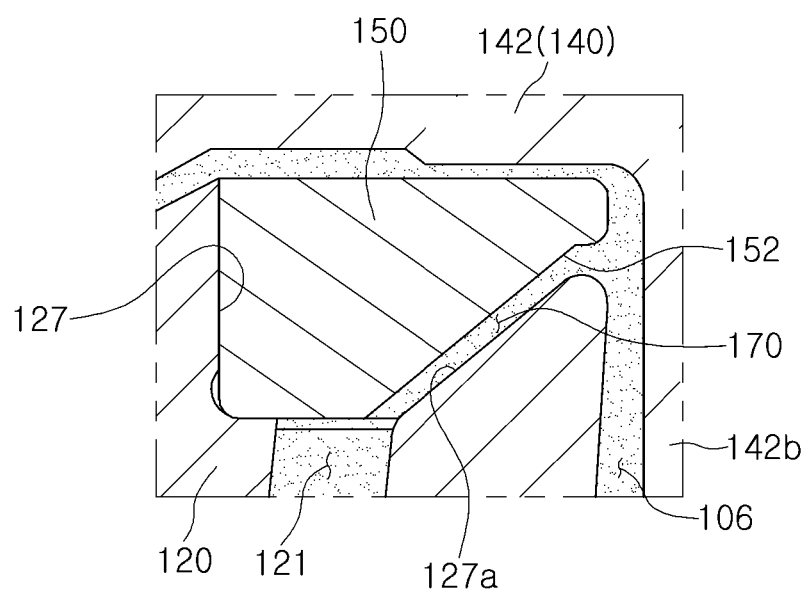
FIG. 2 is an enlarged view of the part A of FIG. 1.
Figure 3:
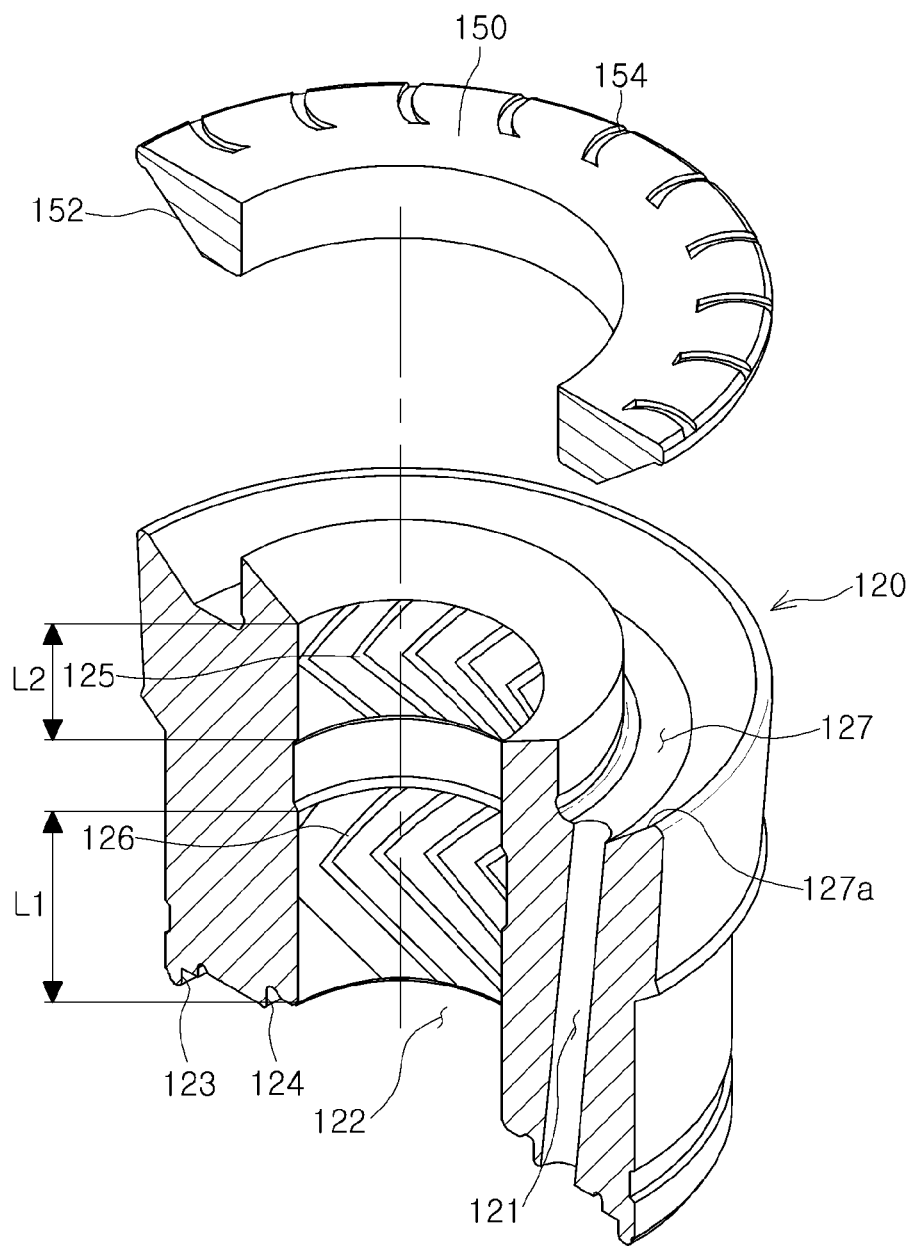
FIG. 3 is a partially cut-away exploded perspective view showing a sleeve and a thrust member included in the spindle motor according to the embodiment of the present invention.
Figure 4:
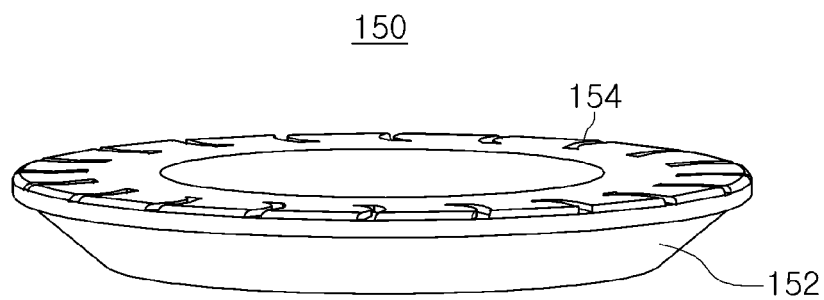
FIG. 4 is a perspective view showing the thrust member according to the embodiment of the present invention.
Figure 5:
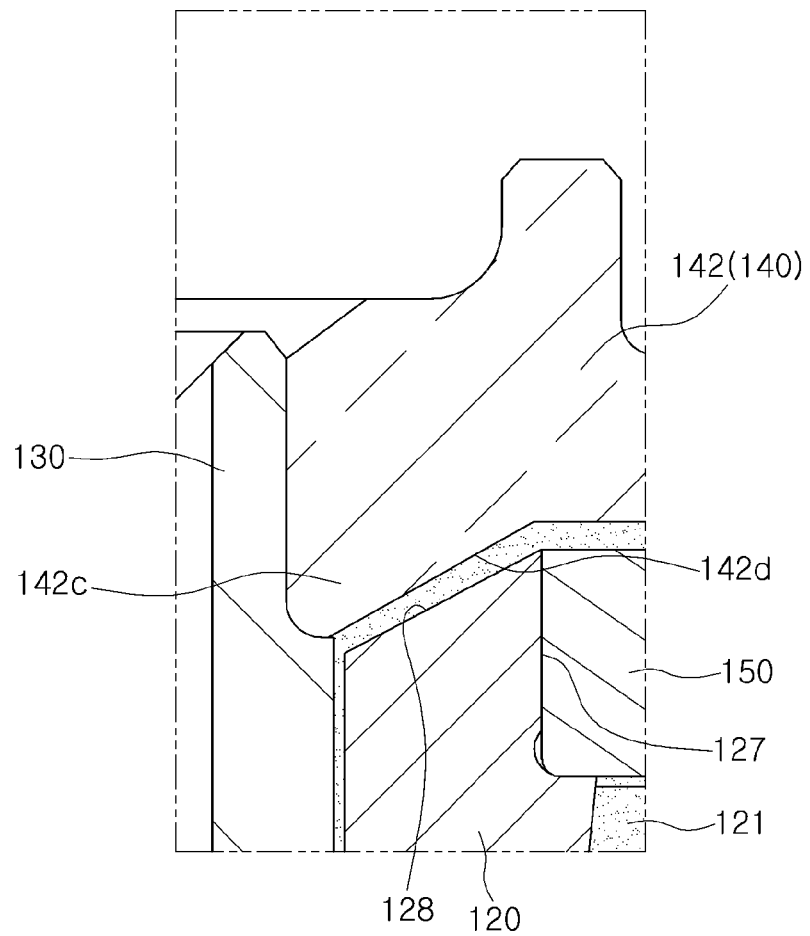
FIG. 5 is an enlarged view showing the part B of FIG. 1.
Figure 6:
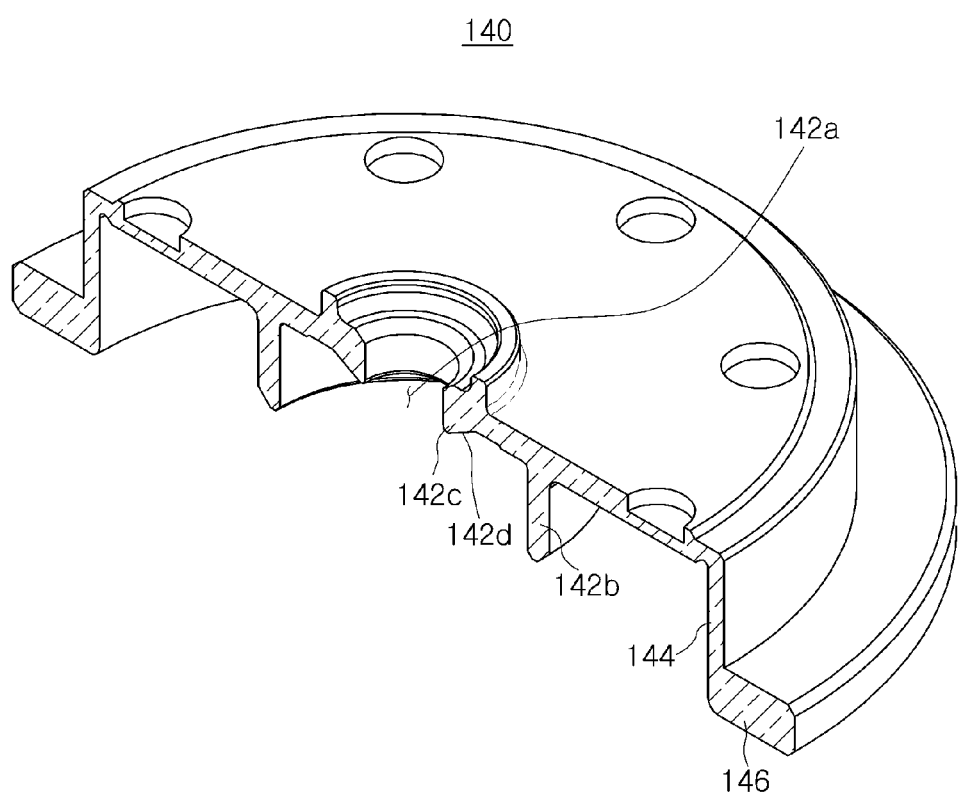
FIG. 6 is a partially cut-away perspective view showing a rotor hub according to the embodiment of the present invention.
Figure 7:
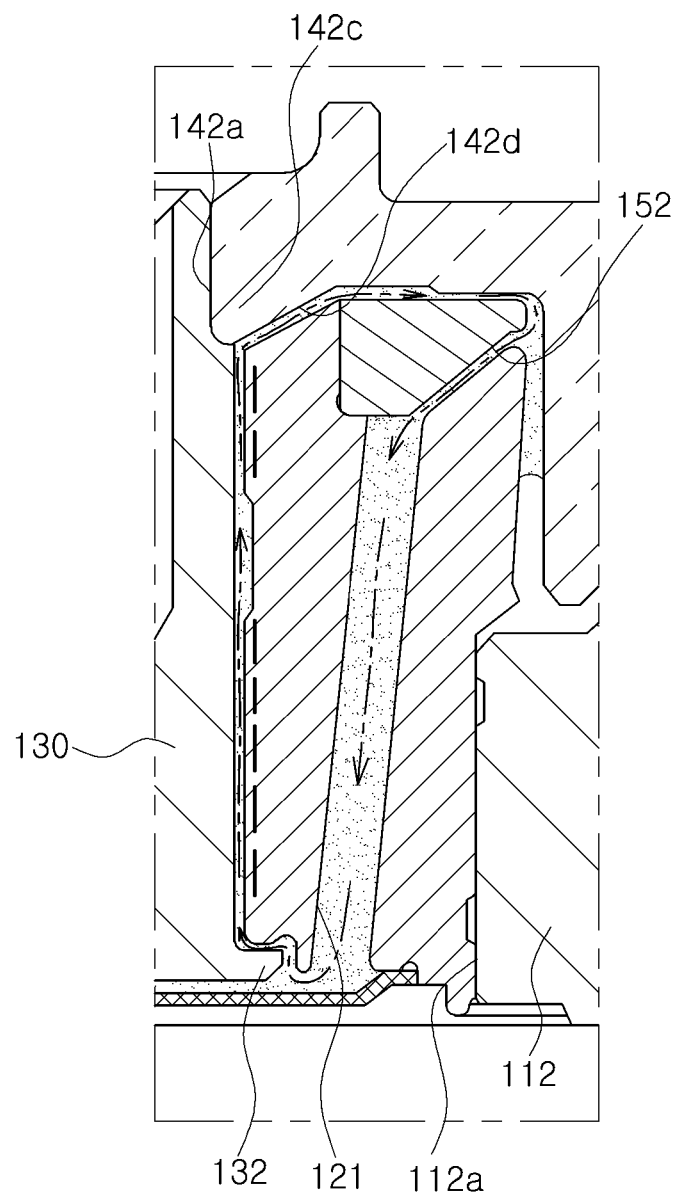
FIGS. 7 and 8 are views for describing an operation of the spindle motor according to the embodiment of the present invention.
Figure 8:
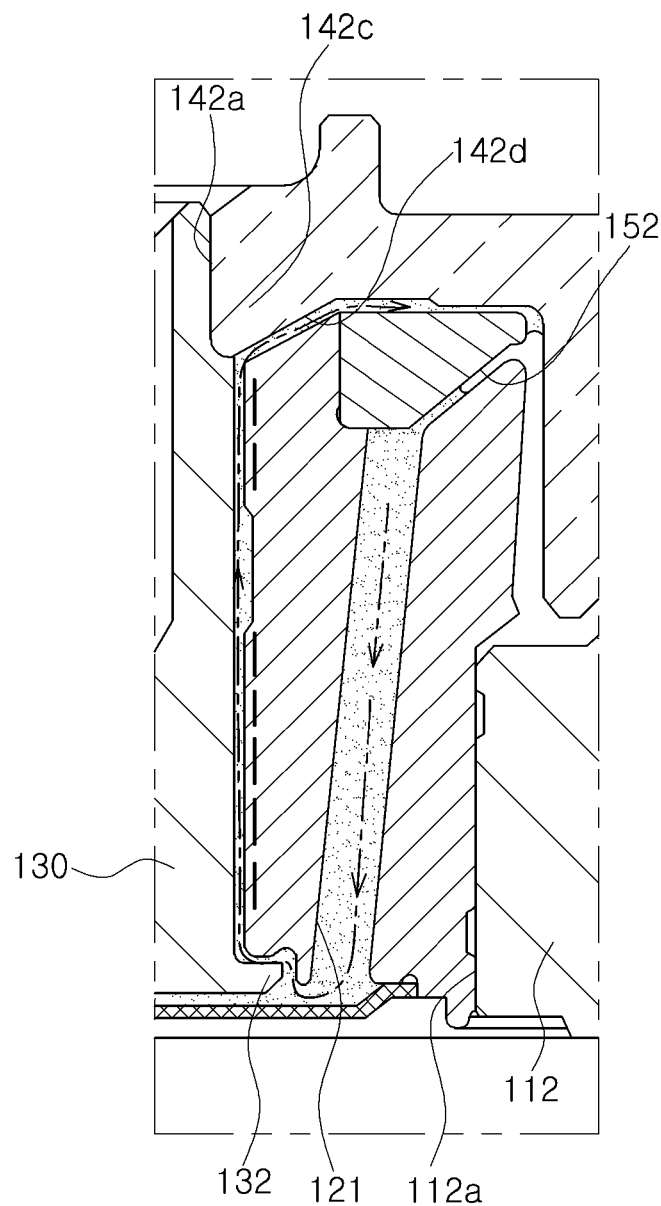

FIG. 1 is a schematic cross-sectional view showing a spindle motor according to an embodiment of the present invention; FIG. 2 is an enlarged view of the part A of FIG. 1; FIG. 3 is a partially cut-away exploded perspective view showing a sleeve and a thrust member included in the spindle motor according to the embodiment of the present invention; FIG. 4 is a perspective view showing the thrust member according to the embodiment of the present invention; FIG. 5 is an enlarged view showing the part B of FIG. 1; FIG. 6 is a partially cut-away perspective view showing a rotor hub according to the embodiment of the present invention; and FIGS. 7 and 8 are views for describing an operation of the spindle motor according to the embodiment of the present invention.

Referring to FIGS. 1 through 8, the spindle motor 100 according to the embodiment of the present invention may include a base member 110, a sleeve 120, a shaft 130, a rotor hub 140, a thrust member 150, and a cover member 160 by way of example.

The spindle motor 100 may be a motor used in a recording disk driving device driving a recoding disk.

Here, terms with respect to directions will be defined. As viewed in FIG. 1, an axial direction refers to a vertical direction, that is, a direction from a lower portion of the shaft 130 toward an upper portion thereof or a direction from the upper portion of the shaft 130 toward the lower portion thereof, and a radial direction refers to a horizontal direction, that is, a direction from an outer peripheral surface of the rotor hub 140 toward the shaft 130 or from the shaft 130 toward the outer peripheral surface of the rotor hub 140.

In addition, a circumferential direction refers to a rotation direction along an outer peripheral surface of the rotor hub 140 or the shaft 130.

The base member 110, which is a fixed member, may configure a stator 20. Here, the stator 20, which means all fixed members except for a rotating member, may include the base member 110, the sleeve 120, and the like.

In addition, the base member 110 may include an installation wall part 112 having the sleeve 120 inserted thereinto. The installation wall part 112 may protrude in an upward axial direction and include an installation hole 112a formed therein so that the sleeve 120 may be inserted thereinto.

In addition, the installation wall part 112 may have a support surface 112b formed on an outer peripheral surface thereof so that a stator core 104 may be seated thereon, wherein the stator core 104 has a coil 102 wound therearound. That is, the stator core 104 may be fixedly installed on the outer peripheral surface of the installation wall part 112 by an adhesive in a state in which it is seated on the support surface 112b.

However, the stator core 104 may also be installed on the outer peripheral surface of the installation wall part 112 in a press-fitting scheme without using the adhesive. That is, a scheme of installing the stator core 104 is not limited to a scheme of using the adhesive.

In addition, the base member 110 may be molded by performing plastic working (for example, press working) on a steel plate or be molded by die-casting an aluminum (Al) material.

That is, the base member 110 may be manufactured by various materials and various processing methods, and is not limited to the base member 110 shown in the accompanying drawings.

The sleeve 120, which is a fixed member configuring, together with the base member 110, the stator 20, may be fixedly installed on the base member 110 and include a circulation hole 121.

That is, the sleeve 120 may be inserted into and fixed to the above-mentioned installation wall part 112. In other words, a lower end portion of an outer peripheral surface of the sleeve 120 may be bonded to an inner peripheral surface of the installation wall part 112 by at least one of an adhesion method, a welding method, and a press-fitting method.

In addition, the circulation hole 121 may be extended from a lower surface of the sleeve 120 in the axial direction and be inclined.

Meanwhile, the sleeve 120 may include a shaft hole 122 formed therein, wherein the shaft hole 122 has the shaft 130 inserted thereinto. The shaft 130 may be inserted into the shaft hole 122 and be rotatably supported by the sleeve 120.

In addition, the sleeve 120 may include a mounting groove 123 formed at a lower end portion thereof, wherein the mounting groove 123 has a cover member 160 installed therein in order to prevent leakage of a lubricating fluid. In addition, while installing the cover member 160, a bearing clearance filled with the lubricating fluid may be formed by an upper surface of the cover member 160 and a lower surface of the sleeve 120.

Next, the bearing clearance will be described.

The bearing clearance indicates a clearance filled with the lubricating fluid. That is, all of the clearance formed by an inner peripheral surface of the sleeve 120 and an outer peripheral surface of the shaft 130, the clearance formed by the sleeve 120 and the rotor hub 140, the clearance formed by the cover member 160 and the sleeve 120, and the clearance formed by the cover member 160 and the shaft 130 will be defined as the bearing clearances.

In addition, the spindle motor 100 according to the present embodiment may have a structure in which the lubricating fluid is filled in all of the above-mentioned bearing clearances, which is also called a full-fill structure.

Meanwhile, the sleeve 120 may have a step groove 124 formed at a lower end portion thereof. A detailed description of the step groove 124 will be provided below.

In addition, the sleeve 120 may include upper and lower radial dynamic grooves 125 and 126 formed in the inner peripheral surface thereof in order to generate fluid dynamic pressure during rotation of the shaft 130. In addition, the upper and lower radial dynamic grooves 125 and 126 may be disposed to be spaced apart from each other by a predetermined gap and have a herringbone shape or a spiral shape.

However, the above-mentioned upper and lower radial dynamic grooves 125 and 126 are not limited to being formed in the inner peripheral surface of the sleeve 120, but may also be formed in the outer peripheral surface of the shaft 130.

Meanwhile, the upper and lower radial dynamic grooves 125 and 126 may allow the lubricating fluid to move from a lower end portion of the shaft 130 to an upper end portion thereof during rotation of the shaft 130.

To this end, the lower radial dynamic groove 126 may have an axial length L1 longer than an axial length L2 of the upper radial dynamic groove 125. Therefore, fluid dynamic pressure generated by the lower radial dynamic groove 126 is larger than fluid dynamic pressure generated by the upper radial dynamic groove 125, such that the lubricating fluid may finally move from the lower end portion of the shaft 130 to the upper end portion thereof.

As described above, the lubricating fluid finally moves from the lower end portion of the shaft 130 toward the upper end portion thereof, whereby a lifespan of the spindle motor may be further increased. A detailed description thereof will be provided below.

In addition, the sleeve 120 may have an installation groove 127 formed at an upper end portion thereof, wherein the installation groove 127 has the above-mentioned thrust member 150 installed therein. The installation groove 127 may have a shape corresponding to that of the thrust member 150, and one side of the circulation hole 121 may be opened to the bottom surface of the installation groove 127.

A more detailed description of the installation groove 127 will be provided in describing the thrust member 150.

In addition, the sleeve 120 may have a downwardly inclined surface 128 formed on an upper surface thereof, wherein the downwardly inclined surface 128 is inclined downwardly toward the shaft hole 121. The downwardly inclined surface 128 may be disposed at an inner side of the installation groove 127 in the radial direction and serve to allow an inner diameter portion of the rotor hub 140 to be formed at a thick thickness.

The shaft 130, which is a rotating member, may configure a rotor 40. Here, the rotor 40 means a member rotatably supported by the stator 20 to thereby rotate.

Meanwhile, the shaft 130 may be rotatably supported by the sleeve 120. In addition, the shaft 130 may include a stopper part 132 formed at a lower end portion thereof, wherein the stopper part 132 is inserted into a step groove 124.

The stopper part 132 may be extended from the lower end portion of the shaft 130 in an outer diameter direction and serve to prevent excessive floating of the shaft 130 simultaneously with preventing the shaft 130 from being separated upwardly from the sleeve 120.

That is, the stopper part 132 may prevent the shaft 130 from being separated upwardly from the sleeve 120 due to external impact. In addition, the shaft 130 may be floated at a predetermined height during rotation. At this time, the stopper part 132 may serve to prevent the shaft 130 from being excessively floated.

Further, the shaft 130 may have the rotor hub 140 coupled to an upper end portion thereof. To this end, in the case in which the shaft 130 is installed in the sleeve 120, the upper end portion of the shaft 130 may be disposed to protrude upwardly of the sleeve 120.

The rotor hub 140, which is a rotating member configuring, together with the shaft 130, the rotor 40, may be fixedly installed on the upper end portion of the shaft 130 and rotate together with the shaft 130.

Meanwhile, the rotor hub 140 may include a rotor hub body 142 provided with an mounting hole 142a into which the upper end portion of the shaft 130 is inserted, a magnet mounting part 144 extended from an edge of the rotor hub body 142 in a downward axial direction, and a disk seating part 146 extended from a distal end of the magnet mounting part 144 in the outer diameter direction.

In addition, the magnet mounting part 144 may have a driving magnet 144a installed on an inner surface thereof, wherein the driving magnet 144a is disposed to face a front end of the stator core 104 having the coil 102 wound therearound.

Meanwhile, the driving magnet 144a may have an annular ring shape and be a permanent magnet generating magnetic force having a predetermined strength by alternately magnetizing N and S poles in the circumferential direction.

Here, rotational driving of the rotor hub 140 will be briefly described. When power is supplied to the coil 102 wound around the stator core 104, driving force capable of rotating the rotor hub 140 may be generated by an electromagnetic interaction between the driving magnet 144a and the stator core 104 having the coil 102 wound therearound.

Therefore, the rotor hub 140 may rotate. In addition, the shaft 130 to which the rotor hub 140 is fixedly installed may rotate together with the rotor hub 140 by the rotation of the rotor hub 140.

Meanwhile, the rotor hub body 142 may be provided with an extension wall part 142b extended in the downward axial direction so as to form, together with the outer peripheral surface of the sleeve 120, an interface F1 between the lubricating fluid and air, that is, a liquid-vapor interface F1.

An inner surface of the extension wall part 142b may be disposed so as to face the outer peripheral surface of the sleeve 120, and at least one of the outer peripheral surface of the sleeve 120 and the inner surface of the extension wall part 142b may be inclined so as to form the liquid-vapor interface F1.

That is, at least one of the outer peripheral surface of the sleeve 120 and the inner surface of the extension wall part 142b may be inclined so as to form the liquid-vapor interface F1 through a capillary phenomenon.

In addition, both of the outer peripheral surface of the sleeve 120 and the inner surface of the extension wall part 142b may be inclined. In this case, both of the inclination angles of the outer peripheral surface of the sleeve 120 and the inner surface of the extension wall part 142b may be different from each other.

Meanwhile, a space formed by the inner surface of the extension wall part 142b and the outer peripheral surface of the sleeve 120 is called a sealing part 106, and the liquid-vapor interface F1 may be disposed in the sealing part 106.

In addition, an inner diameter portion of the rotor hub body 142 may be provided with a protrusion part 142c inclined so as to correspond to the downwardly inclined surface 128 of the sleeve 120.

The protrusion part 142c may serve to increase an area of an inner peripheral surface of the rotor hub body 142. Therefore, a contact area between the rotor hub 140 and the shaft 130 may be increased.

As a result, coupling force between the rotor hub 140 and the shaft 130 may be increased due to the increase in the contact area between the rotor hub 140 and the shaft 130.

A more detailed description thereof will be provided below. The rotor hub 140 and the shaft 130 may be coupled to each other by an adhesive and/or press-fitting. In this case, the rotor hub 140 and the shaft 130 need to be coupled to each other while having predetermined coupling force therebetween so as not to be separated from each other even though external impact is applied thereto.

That is, the inner peripheral surface of the rotor hub body 142 forming the mounting hole 142a needs to have an axial length capable of generating the coupling force of a predetermined magnitude or more by contacting the shaft 130.

To this end, the rotor hub body 142 may be provided with the protrusion part 142c, and the contact area between the shaft 130 and the rotor hub body 142 may be increased by the protrusion part 142c. Therefore, the coupling force between the shaft 130 and the rotor hub 140 may be further increased.

In addition, the protrusion part 142c may have a corresponding inclined surface 142d so as to correspond to the downwardly inclined surface 128 of the sleeve 120.

Therefore, in the case in which the external impact is applied to the rotor hub body 142, damage to the rotor hub body 142 at the inner diameter portion of the rotor hub body 142 may be further suppressed.

That is, in the case in which a lower surface of the protrusion part 142c is not inclined (for example, in the case in which a transversal cross section of the protrusion part has a rectangular shape), an edge of the protrusion part may be easily damaged due to the external impact in the case of an external impact. In this case, foreign materials generated due to the damage are introduced into the bearing clearance, such that rotation characteristics of the shaft 130 may be deteriorated.

However, since the corresponding inclined surface 142d of the protrusion part 142c and the downwardly inclined surface 128 of the sleeve 120 disposed to face the corresponding inclined surface 142d of the protrusion part 142c are inclined as described above, the damage may be decreased in the case of an external impact. Further, the deterioration of the rotation characteristics of the shaft 130 may be prevented.

Further, in the case in which the lower surface of the protrusion part 142c is not inclined (for example, in the case in which the transversal cross section of the protrusion part 142c has the rectangular shape), since a bearing clearance formed by the protrusion part that is not inclined and the sleeve 120 is bent at an angle of 90 degrees, movement of the lubrication fluid may be hindered and a pressure change may be generated. Therefore, there is a risk that an air bubble will be generated.

However, since the corresponding inclined surface 142d of the protrusion part 142c and the downwardly inclined surface 128 of the sleeve 120 are inclined as described above, the lubricating fluid may more easily move and the pressure change may be decreased.

Further, since external force may be dispersed in a horizontal direction and a vertical direction by the inclined protrusion part 142c in the case of an external impact, the damage to the rotor hub 142 due to the external impact may be further decreased.

As described above, even in the case of decreasing a thickness of the rotor hub body 142 in order to implement thinness, a decrease in the contact area between the shaft 130 and the inner diameter portion of the rotor hub body 142 is suppressed by the protrusion part 142c, whereby a decrease in the coupling force between the shaft 130 and the rotor hub 140 may be prevented. Therefore, separation between the shaft 130 and the rotor hub 140 due to the external impact may be prevented.

In addition, the corresponding inclined surface 142d of the protrusion part 142c is inclined, whereby the damage to the rotor hub body 142 may be decreased, the lubricating fluid may more easily move, and the pressure change may be decreased.

Meanwhile, although the case in which the corresponding inclined surface 142d of the protrusion part 142c and the downwardly inclined surface 128 of the sleeve 120 are inclined at the same angle to thereby be disposed in parallel with each other has been described by way of example in the present embodiment, the present invention is not limited thereto.

That is, the corresponding inclined surface 142d and the downwardly inclined surface 128 may also be inclined so as to have different gradients.

The thrust member 150 may be a fixed member configuring, together with the base member 110 and the sleeve 120, the stator 20. In addition, the thrust member 150 may be installed in the installation groove 127 of the sleeve 120 and form a connection part 170 connected to the circulation hole 121 while being installed in the installation groove 127.

The connection part 170 may be formed by the sleeve 120 and the rotor hub 140 and serve to connect the sealing part 106 in which the liquid-vapor interface F1 is disposed and the circulation hole 121 to each other. A detailed description thereof will be provided below.

Meanwhile, a thickness of an inner diameter portion of the thrust member 150 (an axial length of the inner diameter portion of the thrust member 150) may be different from that of an outer diameter portion thereof (that is, an axial length of the outer diameter portion thereof).

As an example, a transversal cross section of the thrust member 150 may have an approximately trapezoidal shape. More specifically, a radial length of an upper end portion of the thrust member 150 may be longer than that of a lower end portion thereof. In addition, the thrust member 150 may have a constant inner diameter.

In addition, the thrust member 150 may have an inner peripheral surface contacting an inner wall surface of the installation groove 127 and a lower surface contacting the bottom surface of the installation groove 127. Further, the thrust member 150 may include an inclined surface 152 extended from the lower surface thereof.

As described above, the transversal cross section of the thrust member 150 has the approximately trapezoidal shape, whereby damage to the thrust member 150 may be decreased in the case of an external impact.

Meanwhile, in the case in which the thrust member 150 is installed in the installation groove 127, a facing surface 127a of the installation groove 127 disposed to face the inclined surface 152 and the inclined surface 152 may be disposed to be spaced apart from each other by a predetermined gap to form the connection part 170.

As described above, in the case in which the thrust member 150 is installed on the sleeve 120, the thrust member 150 and the sleeve 120 may form the connection part 170 to connect the circulation hole 121 and the sealing part 106 to each other.

As a result, since the bearing clearance formed by the sleeve 120 and the cover member 160 and the sealing part 106 are in communication with each other only by installing the thrust member 150 on the sleeve 120, generation of negative pressure may be decreased.

In other words, since the bearing clearance formed by the sleeve 120 and the cover member 160 and the sealing part 106 are in communication with each other by the circulation hole 121 and the connection part 170, the generation of the negative pressure in the bearing clearance formed by the sleeve 120 and the cover member 160 may be decreased.

In addition, a component for decreasing the generation of the negative pressure may be more easily formed as compared with the case in which only the circulation hole is formed so that the bearing clearance formed by the sleeve 120 and the cover member 160 and the sealing part 106 are in communication with each other. That is, in the case in which the circulation hole is formed so that the bearing clearance formed by the sleeve 120 and the cover member 160 and the sealing part 106 are in communication with each other, generation of a defect in manufacturing the sleeve 120 may be decreased.

Meanwhile, the thrust member 150 may be bonded to the installation groove 127 of the sleeve 120 by an adhesive. In addition, a groove in which the adhesive may be filled may be formed at an edge at which the inner wall surface and the lower surface of the installation groove 127 meet each other to increase coupling force between the thrust member 150 and the sleeve 120.

In addition, the thrust member 150 may be formed of a material different from that of the sleeve 120. That is, the thrust member 150 may be formed of a material having excellent abrasion resistance.

However, the present invention is not limited thereto. That is, the thrust member 150 and the sleeve 120 may also be formed of the same material. In this case, outer surfaces of the thrust member 150 and the sleeve 120 may be coated with different materials. That is, the outer surface of the thrust member 150 may also be coated with a material for improving the abrasion resistance.

Meanwhile, a thrust dynamic groove 154 may be formed in an upper surface of the thrust member 150. However, the thrust dynamic groove 154 is not limited to being formed in the upper surface of the thrust member 150, but may also be formed in the rotor hub.

In addition, the thrust dynamic groove 154 may pump the lubricating fluid in an inner diameter direction. That is, the thrust dynamic groove 154 may pump the lubricating fluid in the inner diameter direction so as to prevent the lubricating fluid from being leaked from the sealing part 106 to the outside.

Next, movement of the lubricating fluid will be described in more detail.

When manufacturing the spindle motor 100, an interface (that is, a liquid-vapor interface) between the lubricating fluid and air may be formed in the sealing part 106. In addition, when the shaft 130 rotates before the lubricating fluid is evaporated, the lubricating fluid may move from the lower end portion of the shaft 130 to the upper end portion thereof, as shown in FIG. 7. Then, the lubricating fluid moved along the bearing clearance may again move toward the lower portion of the shaft 130 through the connection part 170 and the circulation hole 121.

Meanwhile, when the spindle motor 100 is used for a long period of time, the liquid-vapor interface may move toward an upper portion of the sealing part 106 due to the evaporation of the lubricating fluid. When a predetermined amount or more of lubricating fluid is evaporated, the lubricating fluid may be separated into two portions. In this case, as shown in FIG. 8, one liquid-vapor interface may be formed at an upper portion of the sealing part 106, and another liquid-vapor interface may be additionally formed at the connection part 170.

As described above, even though the lubricating fluid is evaporated, the liquid-vapor interfaces are formed at the upper portion of the sealing part 106 and the connection part 170, respectively, and the lubricating fluid moves from the lower portion of the shaft toward the upper portion thereof, whereby abrasion of the thrust dynamic groove 154 due to the evaporation of the lubricating fluid may be decreased.

That is, in the case in which the lubricating fluid moves from the upper portion of the shaft 130 toward the lower portion thereof (in other words, in the case in which the lubricating fluid moves in an opposite direction to the above-mentioned direction), when a predetermined amount or more of lubricating fluid is evaporated, the lubricating fluid moves from a region in which the thrust dynamic groove 154 is formed toward the shaft 130, such that the region in which the thrust dynamic groove 154 is formed may directly contact a lower surface of the rotor hub 140. In this case, the thrust dynamic groove 154 may be worn.

However, as described above, in the spindle motor 100 according to the embodiment of the present invention, since the lubricating fluid moves from the lower portion of the shaft 130 toward the upper portion thereof, a decrease in a lifespan of the spindle motor 100 due to the evaporation of the lubricating fluid may be suppressed.

The cover member 160, which is a fixed member configuring, together with the base member 110, the sleeve 120, and the thrust member 150, the stator 20, may be fixedly installed on a lower surface of the sleeve 120 to prevent leakage of the lubricating fluid.

That is, the cover member 160 may be bonded to the mounting groove 123 of the sleeve 120 by at least one of an adhering method and a welding method.

As described above, even though a predetermined amount or more of lubricating fluid is evaporated, damage to the thrust dynamic groove 154 is prevented, whereby a lifespan of the spindle motor may be increased.

In addition, the transversal cross section of the thrust member 150 has the approximately trapezoidal shape, whereby damage to the thrust member 150 may be decreased in the case of an external impact.

In addition, since the circulation hole 121 of the sleeve 120 and the sealing part 106 are in communication with each other by installing the thrust member 150 on the sleeve 120, generation of negative pressure in the bearing clearance formed by the sleeve 120 and the cover member 160 may be decreased.

Further, a component for decreasing the generation of the negative pressure may be more easily formed as compared with the case in which only the circulation hole is formed so that the bearing clearance formed by the sleeve 120 and the cover member 160 and the sealing part 106 are in communication with each other.

That is, in the case in which the circulation hole is formed so that the bearing clearance formed by the sleeve 120 and the cover member 160 and the sealing part 106 are in communication with each other, generation of a defect in manufacturing the sleeve 120 may be decreased.

Further, since a portion of the thrust member 150 disposed to face the rotor hub 140 is formed of a material having high abrasion resistance or the thrust member 150 having an outer surface coated with a material having high abrasion resistance is disposed, generation of foreign materials due to abrasion may be decreased.

In addition, a decrease in the thrust fluid dynamic pressure generated by the thrust dynamic groove 154 due to the abrasion may be suppressed by the thrust member 150 formed of the material having the high abrasion resistance or having the outer surface coated with the material having the high abrasion resistance.

In addition, a contact area between the shaft 130 and the rotor hub body 142 may be increased by the protrusion part 142c formed at the rotor hub body 142. Therefore, the coupling force between the shaft 130 and the rotor hub 140 may be further increased.

Further, since the protrusion part 142c has the corresponding inclined surface 142d, in the case in which external impact is applied to the rotor hub body 142, damage to the rotor hub body 142 at the inner diameter portion of the rotor hub body 142 may be further suppressed.

In addition, generation of foreign materials due to the damage to the protrusion part 142c during generation of external impact may be decreased by the corresponding inclined surface 142d.

Further, as compared with the case in which the lower surface of the protrusion part 142c is not inclined (for example, the case in which a transversal cross section of the protrusion part has a rectangular shape), the lubricating fluid may more easily move and the pressure change may be decreased by the corresponding inclined surface 142d, such that generation of the air bubble may be suppressed.

Hereinafter, a spindle motor according to another embodiment of the present invention will be described with reference to the accompanying drawings. However, an illustration and a detailed description of components that are the same as the components included in the spindle motor according to the embodiment of the present invention described above will be denoted by the same reference numerals will be omitted.

Figure 9:
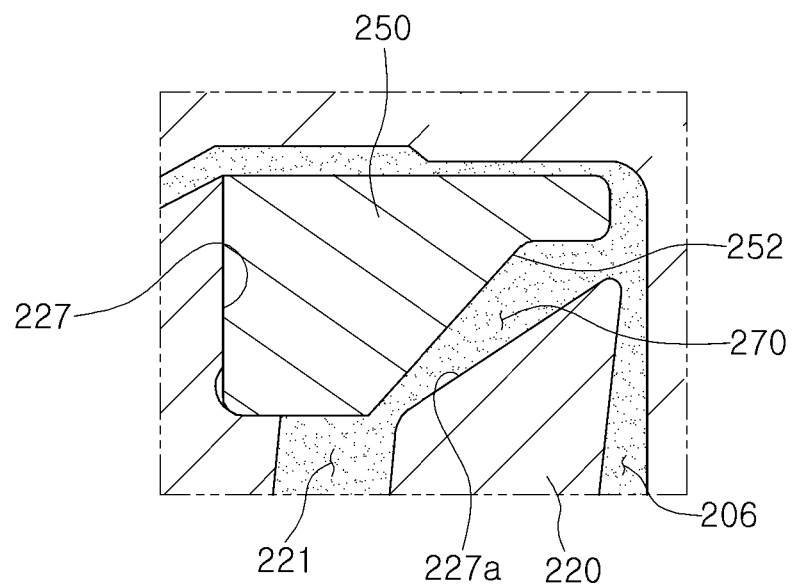
FIG. 9 is an enlarged view showing a portion corresponding to the part A of FIG. 1 in a spindle motor according to another embodiment of the present invention.

FIG. 9 is an enlarged view showing a portion corresponding to the part A of FIG. 1 in a spindle motor according to another embodiment of the present invention.

Referring to FIG. 9, a transversal cross section of a thrust member 250 may have an approximately trapezoidal shape.

In addition, the thrust member 250 may have an inner peripheral surface contacting an inner wall surface of an installation groove 227 and a lower surface contacting the bottom surface of the installation groove 227. Further, the thrust member 250 may include an inclined surface 252 extended from the lower surface thereof.

Meanwhile, in the case in which the thrust member 250 is installed in the installation groove 227, a facing surface 227a of the installation groove 227 disposed to face the inclined surface 252 and the inclined surface 252 may be disposed to be spaced apart from each other by a predetermined gap to form a connection part 270.

As described above, in the case in which the thrust member 250 is installed on the sleeve 220, the thrust member 250 and the sleeve 220 may form the connection part 270 to connect a circulation hole 221 and a sealing part 206 to each other.

In addition, the facing surface 227a of the installation groove 227 disposed to face the inclined surface 252 may have a gradient different from that of the inclined surface 252, and a clearance formed by the inclined surface 252 and the facing surface 227a of the installation groove 227 may be widened in the outer diameter direction to form the connection part 270.

That is, the clearance may be tapered from one end of the connection part 270 connected to the circulation hole 221 toward the other end of the connection part 270 connected to the sealing part 206.

Hereinafter, a spindle motor according to another embodiment of the present invention will be described with reference to the accompanying drawings. However, an illustration and a detailed description of components that are the same as the components included in the spindle motor according to the embodiment of the present invention described above will be denoted by the same reference numerals will be omitted.

Figure 10:
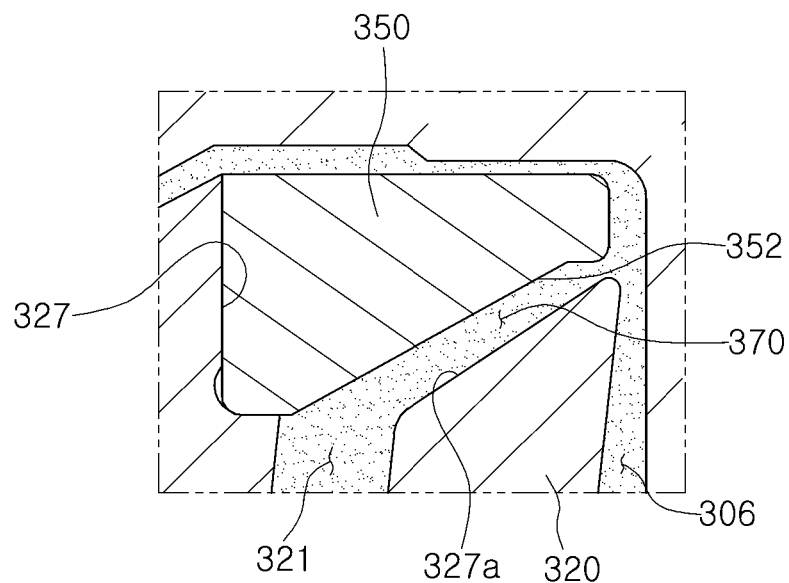
FIG. 10 is an enlarged view showing a portion corresponding to the part A of FIG. 1 in a spindle motor according to another embodiment of the present invention.

FIG. 10 is an enlarged view showing a portion corresponding to the part A of FIG. 1 in a spindle motor according to another embodiment of the present invention.

Referring to FIG. 10, a transversal cross section of a thrust member 350 may have an approximately trapezoidal shape.

In addition, the thrust member 350 may have an inner peripheral surface contacting an inner wall surface of an installation groove 327 and a lower surface contacting the bottom surface of the installation groove 327. Further, the thrust member 350 may include an inclined surface 352 extended from the lower surface thereof.

Meanwhile, in the case in which the thrust member 350 is installed in the installation groove 327, a facing surface 327a of the installation groove 327 disposed to face the inclined surface 352 and the inclined surface 252 may be disposed to be spaced apart from each other by a predetermined gap to form a connection part 370.

As described above, in the case in which the thrust member 350 is installed on the sleeve 320, the thrust member 350 and the sleeve 320 may form the connection part 370 to connect a circulation hole 321 and a sealing part 306 to each other.

In addition, the facing surface 327a of the installation groove 327 disposed to face the inclined surface 352 may have a gradient different from that of the inclined surface 352, and a clearance formed by the inclined surface 352 and the facing surface 327a of the installation groove 327 may be narrowed toward the outer diameter direction to form the connection part 370.

Figure 11:
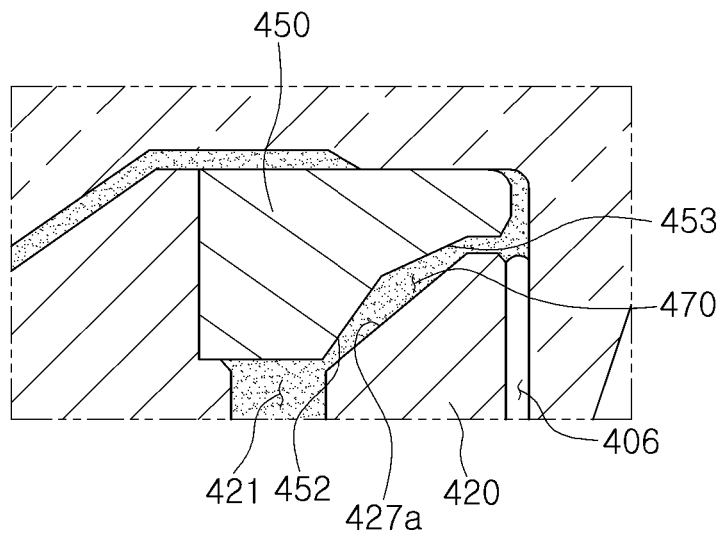
FIG. 11 is an enlarged view showing a portion corresponding to the part A of FIG. 1 in a spindle motor according to another embodiment of the present invention.
Figure 12:
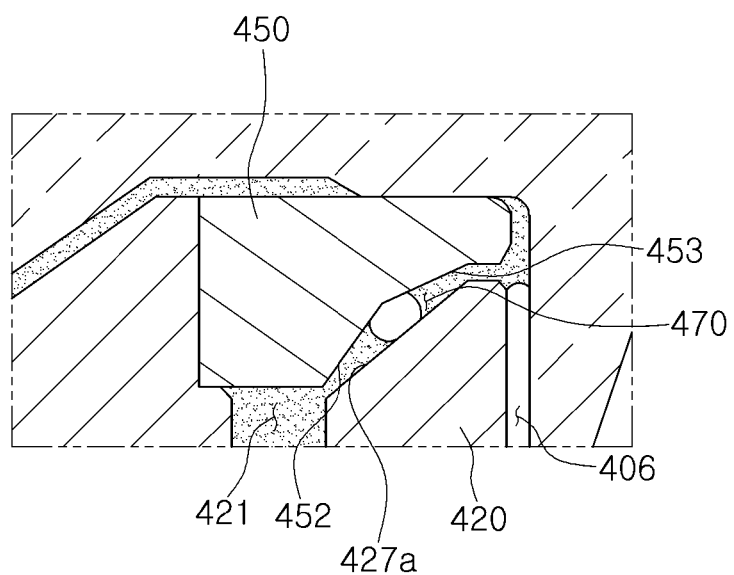
FIG. 12 is a view for describing an operation of a spindle motor according to another embodiment of the present invention.

FIG. 11 is an enlarged view showing a portion corresponding to the part A of FIG. 1 in a spindle motor according to another embodiment of the present invention; and FIG. 12 is a view for describing an operation of a spindle motor according to another embodiment of the present invention.

Referring to FIGS. 11 and 12, a transversal cross section of a thrust member 450 may have an approximately trapezoidal shape.

In addition, the thrust member 450 may have an inner peripheral surface contacting an inner wall surface of an installation groove 427 and a lower surface contacting the bottom surface of the installation groove 427. Further, the thrust member 450 may include first and second inclined surfaces 452 and 453 extended from the lower surface thereof.

Meanwhile, in the case in which the thrust member 450 is installed in the installation groove 427, a facing surface 427a of the installation groove 427 disposed to face the first and second inclined surfaces 452 and 452 and the inclined surfaces 452 and 453 may be disposed to be spaced apart from each other by a predetermined gap to form a connection part 470.

As described above, in the case in which the thrust member 450 is installed on the sleeve 420, the thrust member 450 and the sleeve 420 may form the connection part 470 to connect a circulation hole 421 and a sealing part 406 to each other.

In addition, the facing surface 427a of the installation groove 427 disposed to face the first and second inclined surfaces 452 and 453 may have a gradient different from those of the first and second inclined surfaces 452 and 453. In addition, a clearance formed by the first inclined surface 452 and the facing surface 427a of the installation groove 427 may be widened in the outer diameter direction to form a portion of the connection part 470, and a clearance formed by the second inclined surface 453 and the facing surface 427a of the installation groove 427 may be narrowed in the outer diameter direction to form a portion of the connection part 470.

As described above, since the first and second inclined surfaces 452 and 453 are formed at the thrust member 450, in the case in which a predetermined amount or more of lubricating fluid is evaporated, two liquid-vapor interfaces may be formed in the connection part 470. These two liquid-vapor interfaces may face each other.

Hereinafter, a recording disk driving device according to the embodiment of the present invention will be described with reference to the accompanying drawings.

Figure 13:
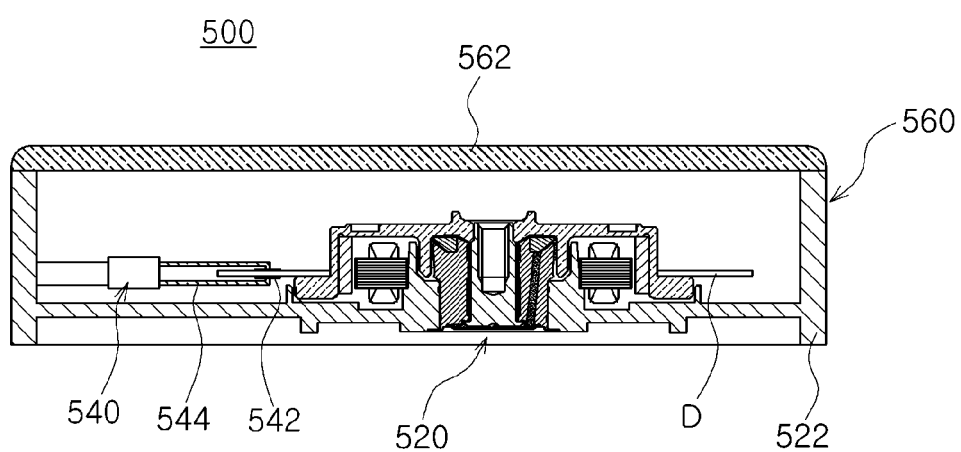
FIG. 13 is a schematic cross-sectional view showing a recording disk driving device according to the embodiment of the present invention.

FIG. 13 is a schematic cross-sectional view showing a recording disk driving device according to the embodiment of the present invention.

Referring to FIG. 13, the recording disk driving device 500 according to the embodiment of the present invention may be a hard disk drive and include a spindle motor 520, a head transfer part 540, and a housing 560.

The spindle motor 520 may be any one of the spindle motor 100 according to the embodiment of the present invention, the spindle motor according to another embodiment of the present invention, and the spindle motor according to another embodiment of the present invention described above and have a recording disk D mounted thereon.

Therefore, a detailed description of the spindle motor 520 and an illustration of reference numerals of the spindle motor 520 will be replaced by the above-mentioned description and be omitted.

The head transfer part 540 may transfer a head 542 detecting information of the recording disk D mounted on the spindle motor 520 to a surface of the recording disk D of which the information is to be detected. The head 542 may be disposed on a support part 544 of the head transfer part 540.

The housing 560 may include a base member 522 and a top cover 562 covering an upper portion of the base member 522 in order to form an internal space accommodating the motor 520 and the head transfer part 540 therein.

As set forth above, according to the embodiment of the present invention, the liquid-vapor interface is additionally formed in the connection part in the case of evaporation of the lubricating fluid, whereby a lifespan of the spindle motor may be increased.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
   a sleeve fixedly installed on the base member and having a circulation hole formed therein;
   a shaft rotatably inserted into a shaft hole of the sleeve;
   a rotor hub fixedly installed on an upper end portion of the shaft; and
   a thrust member installed in an installation groove of the sleeve and forming a connection part while being installed in the installation groove, the connection part being connected to the circulation hole,
   wherein the connection part is formed by the sleeve and the rotor hub and connects a sealing part in which a liquid-vapor interface is disposed and the circulation hole to each other, and
   the sleeve includes upper and lower radial dynamic grooves formed in an inner peripheral surface thereof, the upper and lower radial dynamic grooves allowing a lubricating fluid to move from a lower end portion of the shaft toward the upper end portion thereof during rotation of the shaft.

2. The spindle motor of claim 1, wherein the lower radial dynamic groove has an axial length greater than that of the upper radial dynamic groove.

3. The spindle motor of claim 1, wherein a thickness of an inner diameter portion of the thrust member is different from that of an outer diameter portion thereof.

4. The spindle motor of claim 1, wherein a transversal cross section of the thrust member has a trapezoidal shape.

5. The spindle motor of claim 4, wherein the thrust member has an inclined surface, and
   a facing surface of the installation groove disposed to face the inclined surface and the inclined surface are disposed to be spaced apart from each other by a predetermined gap to form the connection part in the case in which the thrust member is installed in the installation groove.

6. The spindle motor of claim 4, wherein the thrust member has an inclined surface,
   a facing surface of the installation groove disposed to face the inclined surface has a gradient different from that of the inclined surface, and
   a clearance formed by the inclined surface and the facing surface of the installation groove becomes wider toward an outer diameter direction or becomes wider toward an inner diameter direction to form the connection part.

7. The spindle motor of claim 4, wherein the thrust member has first and second inclined surfaces,
   a facing surface of the installation groove disposed to face the first and second inclined surfaces has a gradient different from those of the first and second inclined surfaces, and
   a clearance formed by the first inclined surface and the facing surface of the installation groove becomes wider toward an outer diameter direction and a clearance formed by the second inclined surface and the facing surface of the installation groove becomes narrower toward the outer diameter direction to form the connection part.

8. The spindle motor of claim 1, wherein the thrust member has an inner peripheral surface and a lower surface bonded to the sleeve.

9. The spindle motor of claim 1, wherein a thrust dynamic groove is formed in at least one of an upper surface of the thrust member and a lower surface of the rotor hub in order to generate thrust fluid dynamic pressure.

10. The spindle motor of claim 1, wherein the sleeve and the thrust member are formed of different materials or have outer surfaces coated with different materials.

11. The spindle motor of claim 1, further comprising a cover member fixedly installed on a lower surface of the sleeve to prevent leakage of the lubricating fluid.

12. A recording disk driving device comprising:
   the spindle motor of claim 1 rotating a recording disk;
   a head transfer part transferring a head detecting information of the recording disk mounted on the spindle motor to the recording disk; and
   a housing accommodating the spindle motor and the head transfer part therein.

\* \* \* \* \*